US012667740B2

(12) United States Patent
Shin

(10) Patent No.: US 12,667,740 B2
(45) Date of Patent: Jun. 30, 2026

(54) BATTERY FIRE PREVENTION APPARATUS FOR A VEHICLE

(71) Applicants: HYUNDAI MOTOR COMPANY, Seoul (KR); KIA CORPORATION, Seoul (KR)

(72) Inventor: Hyeon Gi Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 18/590,620

(22) Filed: Feb. 28, 2024

(65) Prior Publication Data

US 2025/0135249 A1 May 1, 2025

(30) Foreign Application Priority Data

Oct. 30, 2023 (KR) ........................ 10-2023-0146235

(51) Int. Cl.
*A62C 3/07* (2006.01)
*A62C 3/16* (2006.01)

(52) U.S. Cl.
CPC . *A62C 3/07* (2013.01); *A62C 3/16* (2013.01)

(58) Field of Classification Search
CPC ........................................................ A62C 3/07
See application file for complete search history.

(56) References Cited

U.S. PATENT DOCUMENTS

| | | | | |
|---|---|---|---|---|
| 10,625,700 | B2 * | 4/2020 | Mummigatti | B60R 21/20 |
| 2011/0132676 | A1 * | 6/2011 | Kodaira | B62D 21/17 180/65.1 |
| 2018/0354438 | A1 * | 12/2018 | Baccouche | B60K 1/04 |
| 2022/0367972 | A1 * | 11/2022 | Zhu | H01M 10/6563 |
| 2022/0407173 | A1 * | 12/2022 | Chae | H01M 10/6567 |
| 2023/0023059 | A1 * | 1/2023 | Ikeda | B62D 21/152 |
| 2023/0261328 | A1 * | 8/2023 | Moon | H01M 50/505 429/158 |
| 2024/0198847 | A1 * | 6/2024 | Mocanu | B60R 21/0136 |
| 2024/0222774 | A1 * | 7/2024 | Jeong | H01M 50/242 |
| 2024/0308591 | A1 * | 9/2024 | Jeong | B62D 25/2036 |
| 2025/0273767 | A1 * | 8/2025 | Yoon | H01M 10/613 |
| 2025/0281778 | A1 * | 9/2025 | Choi | B60L 58/26 |

* cited by examiner

*Primary Examiner* — Erez Gurari
(74) *Attorney, Agent, or Firm* — Lempia Summerfield Katz LLC

(57) ABSTRACT

A battery fire prevention apparatus for a vehicle is able to effectively prevent a fire in a battery due to a collision with an obstacle. When an obstacle collision on a vehicle side is predicted, the battery is effectively protected from an impact caused by the obstacle and a battery fire is prevented by controlling the operations of battery fixing devices, airbag devices, and height control devices.

18 Claims, 7 Drawing Sheets

BATTERY FIRE PREVENTION APPARATUS FOR A VEHICLE

CROSS REFERENCE TO RELATED APPLICATION

The present application claims priority to Korean Patent Application No. 10-2023-0146235, filed Oct. 30, 2023, the entire contents of which are incorporated herein by reference.

BACKGROUND

Technical Field

The present disclosure relates to a battery fire prevention apparatus for a vehicle, the apparatus being able to effectively prevent a fire in a battery due to a collision with an obstacle.

Description of the Related Art

With the growing use of eco-friendly vehicles, such as electric vehicles, there is an increasing risk of fire due to external shocks or internal short circuits in batteries, high-voltage electrical wiring, and the like.

Once a lithium-ion battery used in an electric vehicle has a fire, it is difficult to fully extinguish the fire due to problems such as thermal runaway, and a lot of time and effort are taken to fully extinguish the fire. It is known to be nearly impossible to extinguish a fire by simply spraying water or a fire extinguishing agent when a lithium-ion battery has a fire.

In particular, because the battery pack has an enclosed interior in which ignitable materials and materials containing a large amount of oxygen are present, it is difficult to completely extinguish the fire due to the residual oxygen existing in the battery pack. This difficulty persists even when using conventional methods, such as spraying water or a fire extinguishing agent (e.g., fire extinguishing powder or fire extinguishing liquid) as employed in conventional internal combustion engine vehicles. As a result, the fire may not be completely extinguished and may spread back into the vehicle over time.

Such a battery fire may also occur in the event of an obstacle collision, and because it is difficult to extinguish a fire following the collision, it may be best to prevent battery fires from occurring in advance.

The foregoing is intended merely to aid in the understanding of the background of the present disclosure, and is not intended to mean that the present disclosure falls within the purview of the related art that is already known to those having ordinary skill in the art.

SUMMARY

The present disclosure has been made keeping in mind the above problems occurring in the related art, and the present disclosure is intended to provide a battery fire prevention apparatus for a vehicle. In particular, the apparatus is able to effectively prevent a battery fire resulting from a collision with an obstacle.

The objective of the present disclosure is not limited to the aforementioned description, and other objectives not explicitly disclosed herein should be clearly understood by those having ordinary knowledge (hereinafter, referred to as "those skilled") in the art to which the present disclosure pertains from the description provided hereinafter.

In order to achieve at least one of the above objectives, according to one aspect of the present disclosure, there is provided a battery fire prevention apparatus for a vehicle. The battery fire prevention apparatus includes a mounting frame to which a battery is fixedly coupled. In particular, the mounting frame is configured to guide the battery to be movable in a slidable manner when the battery is released. The battery fire prevention apparatus further includes: obstacle detectors configured to detect an obstacle expected to collide with a vehicle; and a controller configured to output a control signal to protect the battery from the obstacle and prevent a battery fire when an obstacle collision on the vehicle is predicted from signals from the obstacle detectors. The battery fire prevention apparatus further includes: battery fixing devices disposed on the mounting frame and configured to fix the battery to the mounting frame and release the battery in response to the control signal from the controller; and airbag devices each configured to expand and deploy an airbag in response to the control signal from the controller to protect the battery from an impact caused by the obstacle and simultaneously push the battery to slide and move along the mounting frame.

The mounting frame may guide the battery to be slidably movable in a left-right direction of a vehicle body. The obstacle detectors may detect the obstacle expected to collide a side of the vehicle. The airbag devices may be disposed on side portions of the vehicle.

The controller may be configured to output the control signal when the obstacle collision on a side of the vehicle is predicted based on the signals from the obstacle detectors. The controller may control the battery fixing devices to release the battery and also, among the airbag devices, control an airbag device on the side with which the obstacle has collided to perform a deployment operation to push and move the battery away from the side with which the obstacle collides.

The mounting frame may include: a pair of first frames disposed on left and right portions of the vehicle body and extending in a front-back longitudinal direction of the vehicle body; and a pair of second frames disposed on front and rear portions of the vehicle body to be in parallel to each other and extending in a left-right transverse direction of the vehicle body.

The battery may be disposed to be located between the pair of first frames and coupled to the pair of second frames to be slidably movable in a left-right direction of the vehicle body. The battery may be fixed to or released from the second frames by the battery fixing devices.

In an embodiment, front and rear end portions of the battery may be coupled to the second frames by means of a rail structure. The rail structure may include rail couplers and rail portions. The rail couplers are provided on the front and rear end portions of the battery, respectively, and the rail portions are disposed on the pair of second frames. The rail couplers are slidably movably coupled to the rail portions.

The battery fixing devices may respectively include a stopper configured to move back and forth in response to the control signal output by the controller. The rail couplers may respectively include a stopper fixing portion into which a corresponding stopper of the stoppers is fitted by forward movement so that the battery is fixed by the battery fixing devices.

In an embodiment, the stopper fixing portions may include: first fixing recesses allowing the stoppers of the battery fixing devices to be fitted thereinto by forward movement when the battery is located at a mounting position in a normal state at normal times; and second fixing recesses allowing the stoppers of the battery fixing devices to be fitted thereinto by forward movement when the battery is moved by the expanded and deployed airbag.

The airbag devices may be disposed on the pair of first frames, respectively, and the airbag devices are configured to expand and deploy the corresponding airbags to push and move the battery along the second frames.

The airbag devices may be disposed on front and rear portions of the first frames with respect to a direction of the vehicle body.

The battery fire prevention apparatus may further include height control devices configured to adjust vehicle heights of left and right portions of the vehicle body in response to the control signal from the controller.

In one embodiment, the controller may be configured to: determine a height of the obstacle based on the signals from the obstacle detectors; and compare the determined height of the obstacle with a current vehicle ground height. When the current vehicle ground height is higher than the height of the obstacle by a predetermined clearance height, the controller operates none of the height control device and the airbag device and maintains a current vehicle height and an airbag-not-deployed state. The phrase “airbag-not-deployed state” refers to the condition or status of an airbag system in a vehicle when the airbag has not been activated or deployed.

When the current vehicle ground height is not higher than the height of the obstacle by a predetermined clearance height, the controller may compare the height of the obstacle with a predetermined maximum adjustable vehicle height. When the height of the obstacle is lower than the maximum adjustable vehicle height, the controller outputs the control signal to control operations of the height control devices to increase a vehicle height of a side of the vehicle with which the obstacle collides and decreases a vehicle height of a side of the vehicle opposite to the obstacle collision.

In one embodiment, the controller may output the control signal to control the operations of the height control devices to increase the vehicle height of the side of the vehicle with which the obstacle collides to the maximum adjustable vehicle height and to decrease the vehicle height of the side of the vehicle opposite to the obstacle collision to a minimum adjustable vehicle height.

An airbag device of the airbag devices on a side portion of the vehicle body with which the obstacle collides may be controlled to perform a deployment operation to push the battery.

The airbag devices may be disposed on front and rear portions of the mounting frame on the side portions of the vehicle body with respect to the direction of the vehicle body. The controller may be configured to: when the height of the obstacle is lower than the maximum adjustable vehicle height, determine a portion to be collided with the obstacle from front and rear portions of the side of the vehicle in response to the signals from the obstacle detectors; and control only the airbag device on the portion to be collided with the obstacle from the front and rear airbag devices to perform a deployment operation to push the battery.

The controller may be configured to: determine a height of the obstacle to be collided based on the signals from the obstacle detectors; compare the determined height of the obstacle with a predetermined maximum adjustable vehicle height. When the height of the obstacle is higher than the maximum adjustable vehicle height, the controller may output the control signal to control operations of the height control devices to decrease vehicle heights of both left and right portions of the vehicle body to a predetermined minimum adjustable vehicle height.

When the height of the obstacle is higher than the maximum adjustable vehicle height, the controller may control the airbag device on a side portion of the vehicle with which the obstacle collides to perform a deployment operation to push and move the battery away from the obstacle collision.

In the battery fire prevention apparatus according to the present disclosure, when an obstacle collision on a vehicle side is predicted, the battery may be effectively protected from an impact caused by an obstacle and a battery fire may be prevented by controlling the operations of the battery fixing devices, the airbag devices, and the height control devices.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
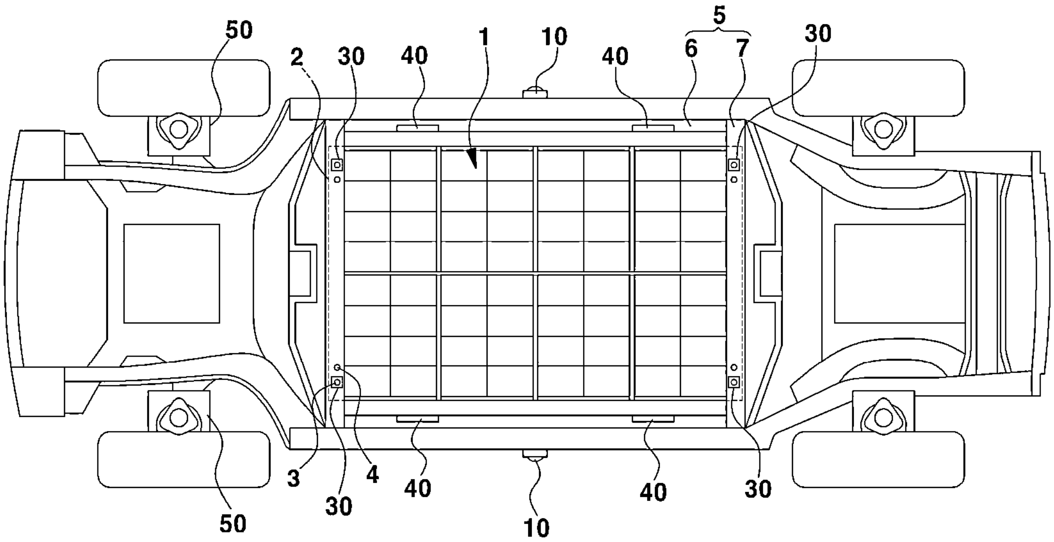
FIG. 1 is a view illustrating a state in which airbag devices and height control devices are disposed in a battery fire prevention apparatus and a direction in which the battery is moved by the airbag in a collision, according to an embodiment of the present disclosure.

Specific structural and functional descriptions of embodiments of the present disclosure disclosed herein are only for illustrative purposes of embodiments of the present disclosure. The present disclosure may be embodied in many different forms without departing from the spirit and significant characteristics of the present disclosure. In addition, the present disclosure is intended to cover not only the exemplary embodiments, but also various alternatives, modifications, equivalents, and other embodiments that may be included within the spirit and scope of the present disclosure.

Although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

Throughout the present disclosure, the same reference numerals refer to the same or like parts. The terminologies used herein are for the purpose of describing particular embodiments only and are not intended to limit the present disclosure. As used herein, singular forms are intended to include plural forms as well, unless not explicitly stated to the contrary unless the context clearly indicates otherwise. It should be further understood that the terms "comprise", "include", "have", etc. when used in the present disclosure, specify the presence of stated features, integers, steps, operations, elements, components, and/or combinations thereof but do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or to perform that operation or function.

Figure 2:
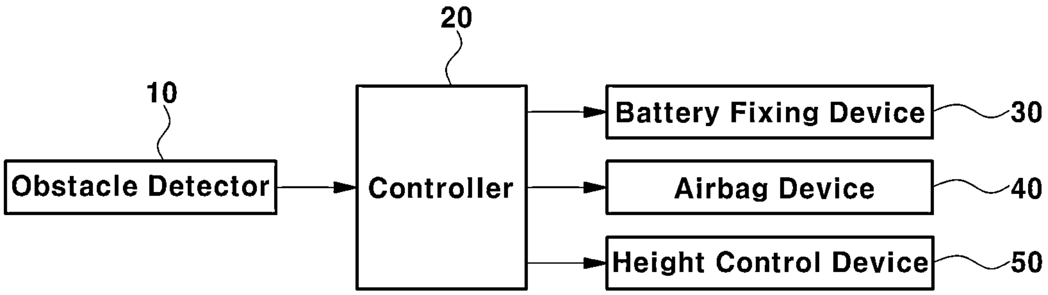
FIG. 2 is a block diagram illustrating main components of the battery fire prevention apparatus according to an embodiment of the present disclosure.

FIG. 1 is a view illustrating a state in which airbag devices and height control devices are disposed in a battery fire prevention apparatus according to the present disclosure and a direction in which the battery is moved by the airbag in a collision, and FIG. 2 is a block diagram illustrating main components of the battery fire prevention apparatus according to the present disclosure.

A vehicle in which the battery fire prevention apparatus according to the present disclosure is disposed may be an electric vehicle on which a battery 1 is mounted. In the following description, the battery 1 may be battery in a pack (i.e., a battery pack).

The battery pack typically includes a battery housing and a battery module disposed within the battery housing. The battery module includes a plurality of unit cells, i.e., battery cells.

When an obstacle collision on a side of the vehicle is predicted, the battery fire prevention apparatus according to the present disclosure may protect the battery of the vehicle from the impact caused by the obstacle and effectively prevent a battery fire from occurring by controlling the operation of battery fixing devices, the airbag device, and the height control device.

In one embodiment, the battery fire prevention apparatus includes a mounting frame 5 disposed on a vehicle body, and the battery may be fixedly coupled to the mounting frame 5. The mounting frame 5 may also provide support for the battery 1 when it is in an unfixed state (i.e., a released state) such that the battery 1 is movable and slidable transversely of the vehicle body.

In addition, the battery fire prevention apparatus further includes: obstacle detectors 10 disposed on a vehicle to detect an obstacle 60 supposed to collide with a side of the vehicle, and a controller 20 that may output a control signal to protect the battery 1 from the impact caused by the obstacle 60 and prevent a battery fire when an obstacle collision on the side of the vehicle is predicted from signals from the obstacle detectors 10.

In addition, the battery fire prevention apparatus further includes: battery fixing devices 30 disposed on the mounting frame 5 and configured to fix the battery 1 to the mounting frame 5 and unfix the battery 1 in response to the control signal from the controller 20. The battery fire prevention apparatus further includes airbag devices 40 disposed on side portions of a vehicle body and each configured to expand and deploy an airbag 41 in response to the control signal from the controller 20 to protect the battery 1 from the impact caused by the obstacle 60 and simultaneously push and move the battery 1 in a lateral direction of the vehicle body. The battery fire prevention apparatus further includes height control devices 50 provided to adjust the height of a left part or a right part of the vehicle body in response to the control signal from the controller 20.

The mounting frame 5 is a structure for mounting the battery 1 on the vehicle body, and is configured to fix the battery 1 to the vehicle body and guide the unfixed battery 1 in a left-right slidable manner.

The mounting frame 5 is provided as a rectangular frame structure capable of fixing or, as required, supporting the battery 1 to be slidable to the left and right. The mounting frame may be a part of a vehicle body configuration as the frame structure of the vehicle body, or may be additionally disposed on an existing vehicle body.

In another embodiment, the mounting frame 5 may include first frames 6 and second frames 7. The mounting frame 5 is provided such that the battery 1 is substantially horizontally disposed at a floor position which is a lower position of the vehicle body in a state in which the battery 1 is coupled to and supported on the mounting frame 5.

In the mounting frame 5, the pair of first frames 6 is disposed on the left and right portions of the vehicle body to be in parallel to each other. The pair of first frames 6 parallel to each other may be side members of components of the vehicle body extending in the longitudinal direction on both left and right portions of the vehicle body or separate frames disposed along the side members.

In addition, the pair of second frames 7 is disposed on the front and rear portions of the vehicle body to be in parallel to each other. The pair of second frames 7 parallel to each other may be cross members of the components of the vehicle body connecting the side members on both the left and right portions or separate frames disposed to connect the pair of first frames.

In one form, the first frames 6 are frames extending forward and backward in the longitudinal direction on both sides of the vehicle body, while the second frames 7 are frames extending in a left-right transverse direction of the vehicle body.

The pair of first frames 6 and the pair of second frames 7 are arranged in a rectangular shape and then fitted together to form a rectangular frame structure. Ends of the first frames 6 are connected and fixed to ends of the second frames 7, thereby forming the rectangular frame structure.

In embodiments of the present disclosure, the battery 1 may be coupled to and supported on the second frames 7 disposed in the left-right transverse direction of the vehicle body. The battery 1 may be coupled to the second frames 7 by means of a rail structure such that the battery 1 is movable to the left and right with respect to the direction of the vehicle body (i.e., in a lateral direction of the vehicle body) along the second frames 7.

Specifically, protruding rail couplers 2 are disposed on the front portion and the rear portion of the battery 1, respectively, to longitudinally extend in the left-right direction. Rail portions 8 are disposed on portions of the pair of second frames 7 facing the front portion and the rear portion of the battery 1, respectively. The rail couplers 2 of the battery 1 are coupled to the rail portions 8 to be slidably guided.

Accordingly, the battery 1 may slide and move in a direction indicated by an arrow in FIG. 1, i.e., in the left-right transverse direction of the vehicle body. The movement of the battery 1 on the second frames 7 may be guided by the rail structure including the rail couplers 2 and the rail portions 8.

In addition, the battery fire prevention apparatus includes the battery fixing devices 30 to fix the position of the battery 1 on the second frames 7. The battery fixing devices 30 are devices selectively fixing or unfixing (or releasing) the battery 1 to or from the second frames 7, and the operation of the battery fixing devices 30 is controlled by the controller 20.

In other words, in a state in which the battery 1 is fixed to the second frames 7 by the battery fixing devices 30, when the controller 20 outputs a control signal (i.e., a collision detection signal) to unfix or release the battery, the operation of the battery fixing devices 30 is controlled to unfix (or release) the battery 1 in response to the control signal output by the controller 20.

The configuration of the battery fixing devices is described in more detail below.

Accordingly, the mounting structure of the battery is fixed by the battery fixing devices and the rail structure at normal times, but when a side collision is predicted, is movable in the direction indicated by the arrow in FIG. 1.

In another embodiment, the battery fire prevention apparatus further includes the airbag devices 40 disposed to expand and deploy in a direction in which the battery 1 is pushed. The airbag devices 40 are disposed to absorb the impact and move the battery 1 in a side collision of the vehicle, and serve to protect the battery and ultimately prevent a battery fire.

The airbag devices 40 may be disposed on any of the first frames 6 or both the pair of first frames 6. In addition, a plurality of airbag devices 40 may be disposed on each of the first frames 6.

In this case, the airbag devices 40 may be disposed to be located on both the left and right side portions of the battery 1 in the vehicle, and may be disposed at front and rear positions on both sides of the vehicle, respectively. In other words, two airbag devices 40 may be disposed on each of the first frames 6 such that a single airbag device 40 is disposed on each of the front and rear positions. The airbag devices 40 may be disposed on the inner surfaces of the first frames 6 such that the airbags 41 may expand and deploy toward the position of the battery 1 on the first frames 6.

The operation of each of the airbag devices 40 is also controlled by the controller 20 to expand and deploy the airbag 41, in response to the control signal (i.e., the collision detection signal) output by the controller 20.

In addition, the battery fire prevention apparatus may further include height control devices 50 disposed between the vehicle body and the respective wheels. The height control devices 50 are configured to adjust the height of the vehicle (hereinafter, also referred to as the "vehicle height") at the positions of the wheels in response to the control signal output by the controller 20.

For the height control device 50 configured to adjust the vehicle height at each wheel position in response to the control signal (i.e., an electrical signal) output by the controller 20, various configurations are known in the art. One of the known height control devices may be adopted and applied in the present disclosure to adjust the vehicle height (i.e., the body height) at each wheel position.

For example, the height control devices include hydraulic height control devices, pneumatic height control devices, and electric height control devices. Hydraulic height control devices control the supply and discharge of hydraulic pressure using a valve to adjust and maintain the vehicle height. Electric height control devices may be respectively configured to adjustment and maintain the vehicle height using a ball screw and a mechanical device.

In one form, a height control device available in the present disclosure may include a piston fixed to an outer peripheral surface of a damper rod of a suspension, a cylinder provided on an outer side of the piston to be movable along the damper rod, and a drive part moving the cylinder up and down.

The drive part is configured to move the cylinder up and down. The drive part may use a variety of driving methods as long the cylinder may be moved up and down. For example, the drive part may be a hydraulic device driven by hydraulic pressure, a pneumatic device driven by compressed air, an electric device driven by a motor, or the like.

In addition, the height control devices 50 may be connected to the configuration of vehicle suspensions to variably adjust the height of the vehicle body. In this case, each of the height control devices 50 may be mounted on a shock absorber the components of each of the vehicle suspensions to variably adjust the height of the vehicle body.

In this case, each of the vehicle suspensions may include a damper rod, a support, and a spring. In the components of each of the height control devices 50, the cylinder is disposed to surround the damper rod and support the bottom end of the spring elastically supporting the vehicle body to adjust the vehicle height due to upward and downward movements.

This configuration of the height control device is illustrative, and the present disclosure is not limited thereto. The configuration of the height control device may be variously modified as long as the vehicle height is adjustable at each wheel position in response to the control signal output by the controller.

In addition, the battery fire prevention apparatus according to the present disclosure may further include obstacle detectors 10 to detect an obstacle supposed to collide with a side of the vehicle. The obstacle detectors 10 are electrically connected to the controller 20. Accordingly, the obstacle detectors 10 may input electrical signals in response to the detection of an object, i.e., obstacle detection signals, to the controller 20.

In one embodiment, the obstacle detectors 10 may be sensors detecting an obstacle supposed to collide with a side of a vehicle, or may be known autonomous driving sensors mounted on autonomous vehicles. In this case, such an autonomous sensors detecting obstacle may include a camera, a light detection and ranging (LiDAR) sensor, or a radar.

Accordingly, the controller 20 may determine whether or not an obstacle approaching a side of the vehicle is present, from obstacle detection signals received from the obstacle detectors 10, to predict and detect a vehicle side collision by the obstacle and determine the height of the colliding obstacle.

In addition, when the vehicle side collision is detected, the controller 20 controls a corresponding one of the airbag devices 40 to perform a deployment operation to expand and deploy the airbag 41, and responsively, the airbag 41 pushes and moves the battery 1 in a direction opposite to the direction in which the obstacle comes. At this time, the airbag 41 absorbs impact applied to the battery 1 by the obstacle and protects the side of the battery 1.

Figure 3:
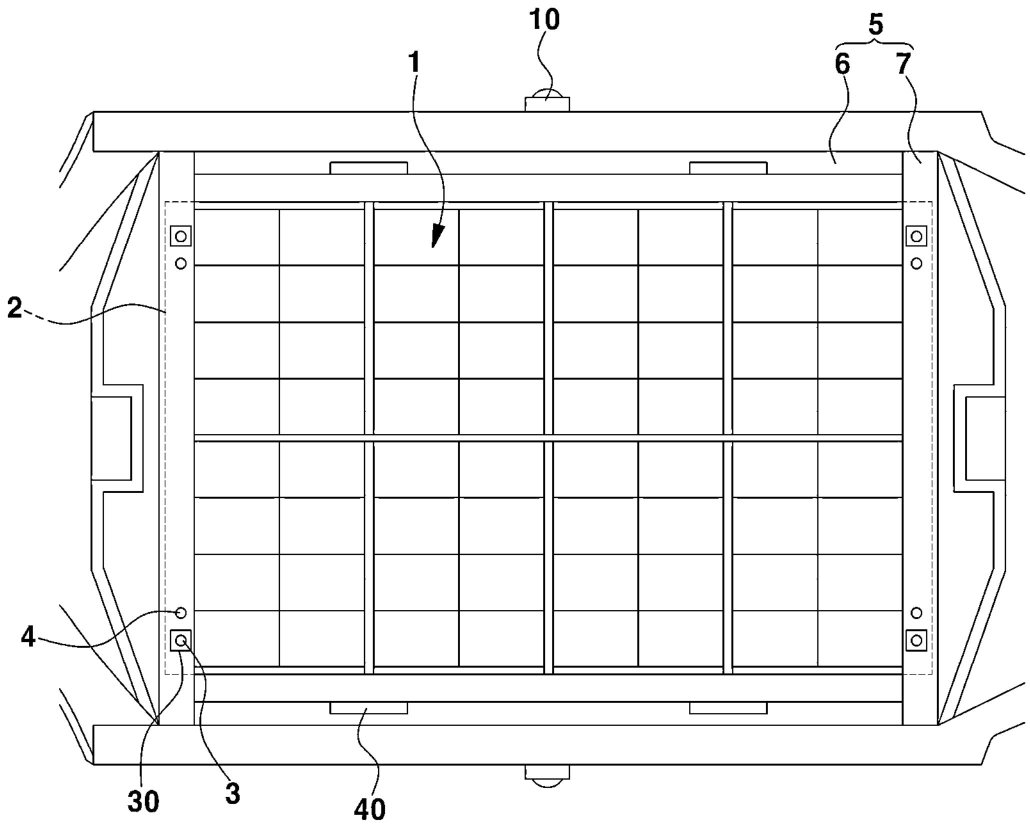
FIG. 3 is a plan view illustrating the state of the battery mounted on the battery fire prevention apparatus according to an embodiment of the present disclosure.
Figure 4:
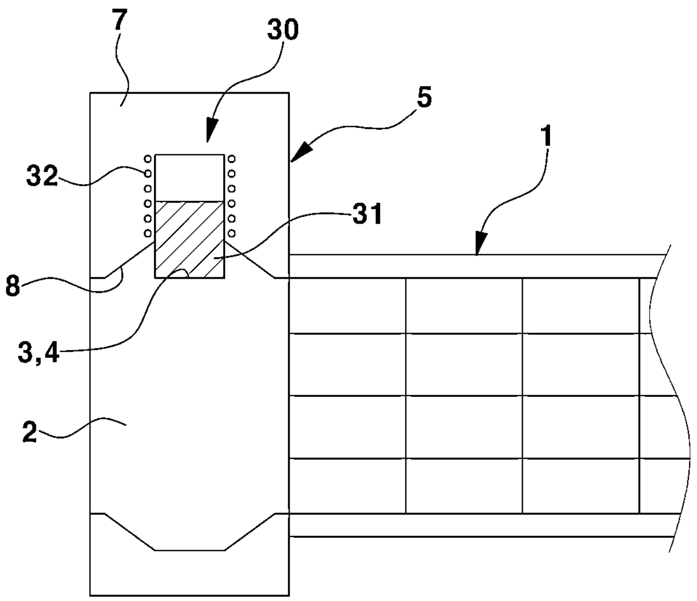
FIGS. 4 and 5 are views illustrating the operating state of battery fixing devices in the battery fire prevention apparatus according to an embodiment of the present disclosure.
Figure 5:
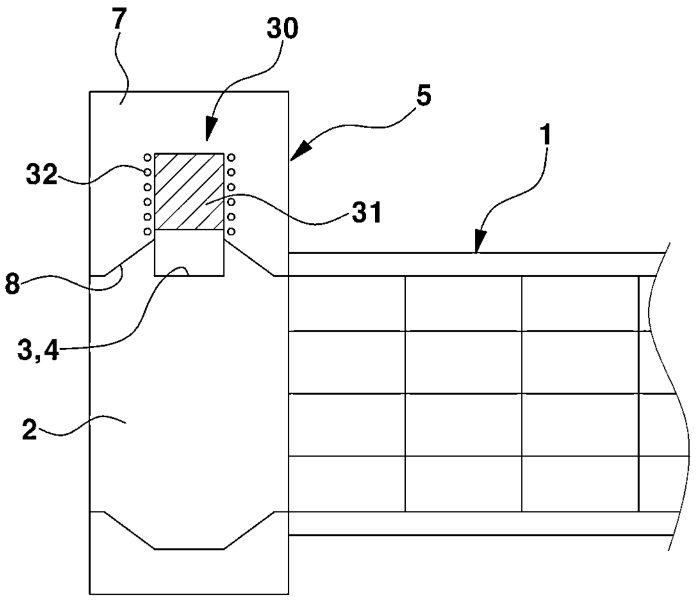
Figure 6:
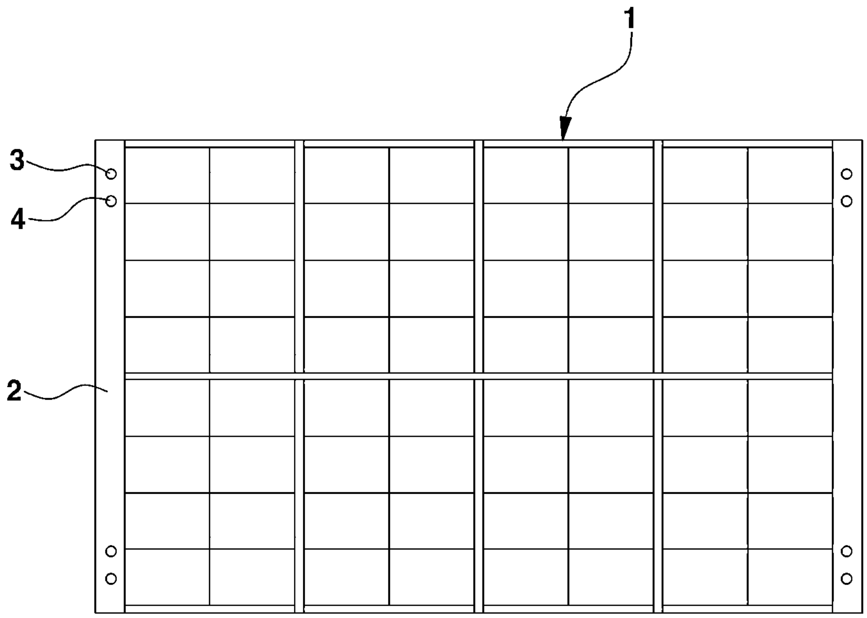
FIG. 6 is a plan view illustrating the battery and rail couplers on the front and rear end portions of the battery according to an embodiment of the present disclosure.

FIG. 3 is a plan view illustrating the state of the battery mounted on the battery fire prevention apparatus according to one embodiment of the present disclosure, FIGS. 4 and 5 are cross-sectional views taken along line A-A' in FIG. 3, and FIG. 6 is a plan view illustrating the battery and rail couplers on the front and rear end portions of the battery according to one embodiment of the present disclosure.

The up and down direction in FIG. 3 is a left and right direction relative to the direction of the vehicle body. In addition, FIGS. 4 and 5 illustrate the operating state of a battery fixing device 30 configured to selectively fix or unfix the battery 1 to or from the vehicle body (i.e., the mounting frame), in which FIG. 4 illustrates a state in which the battery 1 is fixed by the battery fixing device 30 at normal times, and FIG. 5 illustrates a state in which the battery is unfixed (or released) by the battery fixing device 30 upon detection of a collision.

As illustrated in FIG. 3, the mounting frame 5 is a frame structure disposed and assembled so that the pair of first frames 6 and the pair of second frames 7 form a rectangular shape. The first frames 6 and the second frames 7 are integrated by welding corresponding ends of the frames 6 and 7 or fastening the corresponding ends using fastening members such as bolts and nuts.

The airbag devices 40 are disposed at the front and rear positions with respect to the direction of the vehicle body, respectively. Each of the airbag devices 40 is disposed such that the airbag 41 expands and deploys toward the battery 1 when the airbag device 40 operates.

Accordingly, the airbag 41 expanding and deploying during the operation of the airbag device 40 may push the battery 1. The battery 1 may be moved away from the position, at which the operating airbag device is located, by the expanding and deploying airbag 41.

In FIG. 3, when the left side in the figure is the front side in the direction of the vehicle body and the right side in the in the figure is the rear side in the direction of the vehicle body, two battery fixing devices 30 may be disposed on each of the front second frame 7 and the rear second frame 7. That is, two battery fixing devices 30 may be disposed on each second frame 7, one at the left position and one at the right position.

Each of the battery fixing devices 30 may be operated to selectively fix or unfix the battery 1 in response to the control signal output by the controller 20, and may include a stopper 31 operating to move back and forth in response to the control signal output by the controller 20.

In addition, the battery fixing device 30 may be a solenoid-driven actuator including a solenoid 32 as a drive part moving the stopper 31 up and down and back and forth. The solenoid 32 of the battery fixing device 30 is provided to be able to have a battery current applied as a drive current or to cut off the drive current in response to the control signal by the controller 20.

Accordingly, in the battery fixing device 30, the position of the stopper 31 is determined depending on whether or not current is applied to the solenoid 32 or the direction of current application to the solenoid 32. When the stopper 31 has moved downward (i.e., moved forward) as illustrated in FIG. 4, the battery 1 is fixed by the battery fixing device 30. In contrast, when the stopper 31 has moved upward (i.e., moved backward) as illustrated in FIG. 5, the fixed state of the battery 1 by the battery fixing device 30 is released.

In addition, the battery 1 includes stopper fixing portions to which the stoppers 31 of the battery fixing devices 30 may be fixed. The stopper fixing portions may be provided on the rail couplers 2 of the battery 1. Specifically, the stopper fixing portions may have a structure into which a corresponding one of the stopper 31 may be inserted.

Referring to FIG. 6, it can be seen that the rail couplers 2 protrude from the front end portion and the rear end portion of the battery 1 while extending in length in the left-right direction of the battery. In addition, referring to FIGS. 4 and 5, it can be seen that a rail coupler 2 is formed on the distal portion of one end (i.e., the front end portion or the rear end portion) of the battery 1 and the rail coupler 2 is fitted into the rail portion 8 provided on the second frame 7.

Accordingly, the rail coupler 2 of the battery 1 fitted into the rail portion 8 of the second frame 7 may slide and move in the left-right direction of the vehicle body in the longitudinal direction thereof, and the battery 1 may slide and move in the left-right direction of the vehicle body along the second frames 7 of the mounting frame 5.

The rail portions 8 may be groove-shaped components provided in the inner surfaces of the second frames 7 or hole-shaped components extending through the second frames 7, allowing the rail couplers 2 provided on the battery 1 to be fitted thereinto to be guided in the longitudinal direction thereof.

The rail portions 8 are variously modified in structure and shape as long as the rail couplers 2 are coupled in a slidably movable manner for movement of the battery 1 by the deployment of the airbag 41 without being limited to grooves or holes, and any structures or shapes allowing the rail couplers 2 to be coupled in a slidably movable manner may be used.

As illustrated in FIGS. 4 and 5, the rail portions 8 may be formed to have a cross-sectional structure wrapping around the upper ends and the lower ends of the rail couplers 2 inserted fitted into the rail portions 8. This structure may be referred to as a rail structure used to facilitate sliding between each of the rail couplers 2 and the corresponding rail portion 8 when the battery 1 moves in a state in which the rail couplers 2 are fitted into the rail portions 8.

On the rail couplers 2, the stopper fixing portions into which the stoppers 31 may be fixedly inserted are provided. The stopper fixing portions include fixing recesses 3 and 4 into which the stoppers 31 moved downward from the battery fixing devices 30 provided on the second frames 7 may be fitted.

The fixing recesses include first fixing recesses 3 into which the stoppers 31 of the battery fixing devices 30 may be fitted by moving downward (i.e., forward) when the battery 1 is located at a mounting position in a normal state at normal times and second fixing recesses 4 into which the stoppers 31 of the battery fixing devices 30 may be fitted by moving downward when the battery 1 is moved by the airbag 41 in a vehicle side collision.

As illustrated in FIG. 6, the first fixing recesses 3 may be provided in both end portions of the rail couplers 2, respectively. The second fixing recesses 4 may be provided in left and right positions of the rail couplers 2 between the first fixing recesses 3, respectively.

As described above, the position of the stopper 31 in the battery fixing devices 30 is determined depending on whether or not current is applied to the solenoid 32 or the direction of current application to the solenoid 32. As illustrated in FIG. 4, in a normal state at normal times, the stoppers 31 are moved downward and fitted into the first fixing recesses 3 provided in the rail couplers 2 of the battery 1.

Consequently, the battery 1 does not move along the rail portions 8 of the second frames 7 but remains fixed by the battery fixing devices 30. In this case, the position of the battery 1 may be set so that the battery 1 is fixed at a central position between the pair of first frames 6, as illustrated in FIG. 3.

In addition, when the controller 20 detects a side collision, the stoppers 31 of the battery fixing devices 30 are moved upwards and out of the first fixing recesses 3 of the rail couplers 2 of the battery 1. Consequently, the battery 1 is free to move along the rail portions 8 of the second frames 7.

After the battery 1 is moved by the airbag 41 as described above, the controller 20 operates two battery fixing devices 30 of the battery fixing devices 30 more spaced apart from the side with which the obstacle has collided to fix the battery 1.

When the battery fixing devices 30 are disposed on the second frames 7 between the left position and the right position in the direction of the vehicle body, the battery fixing devices 30 disposed on the left portion of the second frames 7 are more spaced away from the right side of the vehicle than the battery fixing devices 30 disposed on the right portion of the second frames 7. In contrast, the battery fixing devices 30 disposed on the right portion of the second frames 7 are more spaced away from the left side of the vehicle than the battery fixing devices 30 disposed on the left side of the second frames 7.

When an obstacle collides with the right side of the vehicle, after the battery 1 is moved to the left by a corresponding airbag 41 of the airbags 41, the stoppers 31 of two battery fixing devices 30 disposed on the left portions of the pair of second frames 7 are moved downwards to be fitted into two second fixing recesses 4 of the rail couplers 2.

Consequently, the battery 1 moved to the left by the airbag 41 is fixed again to the second frames 7 of the mounting frame 5 by the stoppers 31 of the battery fixing devices 30, and then does not move to the left or right any more.

Likewise, when an obstacle collides with the left side of the vehicle, after the battery 1 is moved to the right by a corresponding airbag 41 of the airbags 41, the stoppers 31 of two battery fixing devices 30 disposed on the right portions of the pair of second frames 7 are moved downwards to be fitted into the second fixing recesses 4 of the rail couplers 2.

Consequently, the battery 1 moved to the right by the airbag 41 is fixed again to the second frames 7 of the mounting frame 5 by the stoppers 31 of the battery fixing devices 30, and then does not move to the left or right any more.

Figure 7:
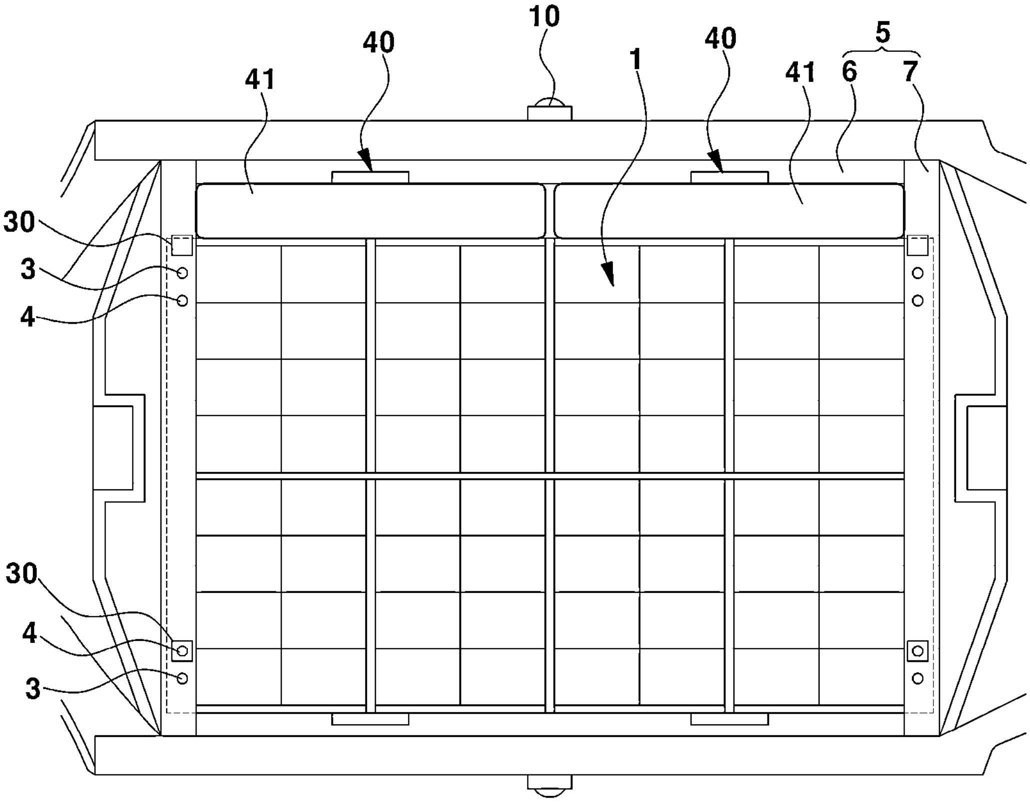
FIG. 7 is a view illustrating a state in which the battery is moved by airbags in the battery fire prevention apparatus according to an embodiment of the present disclosure.

FIG. 7 is a view illustrating a state in which the battery 1 is moved by airbags 41 in the battery fire prevention apparatus according to the present disclosure. In FIG. 7, in a case in which the left side in the figure is the front side in the direction of the vehicle body and the right side in the figure is the rear side in the direction of the vehicle body, when an obstacle is detected on the right from the vehicle and a collision with the right side of the vehicle is predicted, the airbag devices 40 disposed on the right portion of the mounting frame 5 are controlled to perform a deployment operation by the controller 20, as illustrated in FIG. 7.

Referring to FIG. 7, as the airbags 41 are expanded and deployed from the airbag devices 40 on the right portion of the vehicle, the battery 1 is pushed and moved to the left by the airbags 41. Consequently, the battery 1 may be protected from the obstacle colliding with the right side of the vehicle.

At this time, the right first frame 6 primarily absorbs the impact caused by the obstacle and the deploying airbag 41 secondarily absorbs the impact. In addition, the deploying airbag 41 simultaneously serves as an actuator to move the battery 1 along the rail portions 8 of the second frames 7.

When the obstacle is detected on the left from the vehicle and a collision with the right side of the vehicle is predicted, the controller 20 operates the airbag 41 disposed on the left portion of the mounting frame 5 to deploy.

Consequently, the battery 1 is pushed and moved to the right portion of the vehicle by the expanding and deploying airbags 41 on the left portion of the vehicle. As a result, the battery 1 may be protected from the obstacle colliding with the left side of the vehicle.

In addition, the controller may be configured to selectively control only the front airbag device or the rear airbag device to perform a deployment operation, depending on whether an obstacle collides with the front portion or the rear portion of one side of the vehicle.

Figure 8:
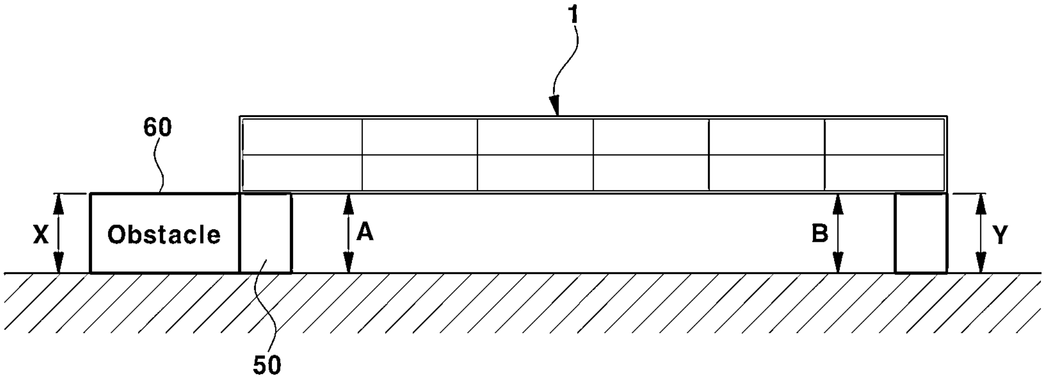
FIG. 8 is a schematic view illustrating a state in which height control devices are disposed in a vehicle using the battery fire prevention apparatus according to an embodiment of the present disclosure.
Figure 9A:
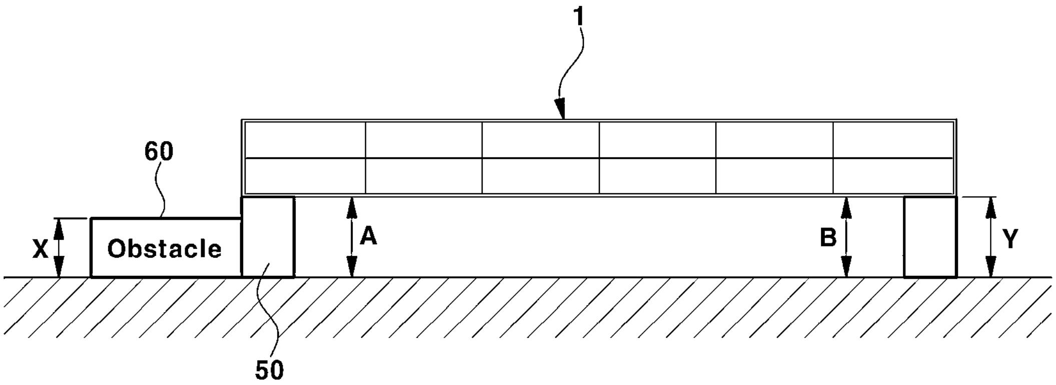
FIGS. 9A, 9B, and 9C are views illustrating the operating state of the height control devices according to the obstacle height in side collisions in the battery fire prevention apparatus according to an embodiment of the present disclosure.
Figure 9B:
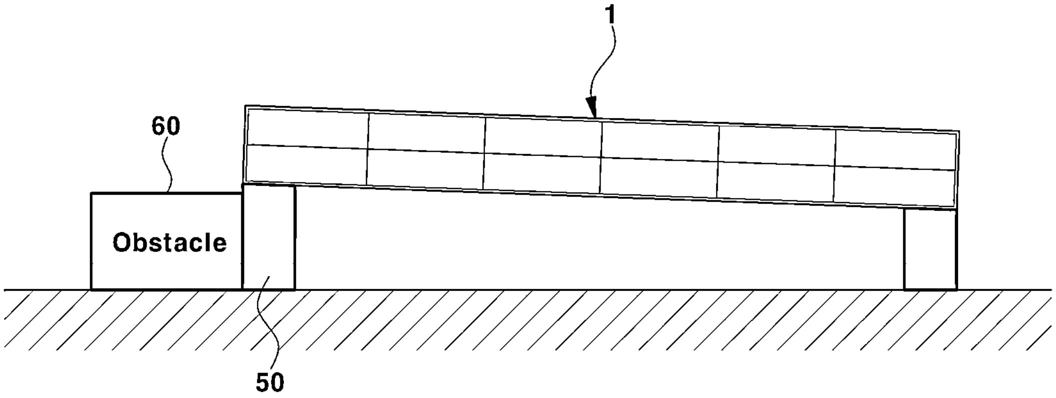
Figure 9C:
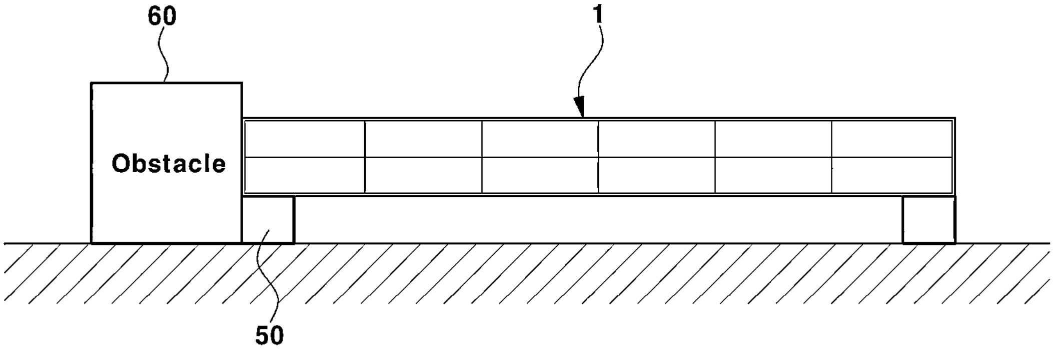

FIG. 8 is a schematic view illustrating a state in which height control devices 50 are disposed in a vehicle using the battery fire prevention apparatus according to the present disclosure, and FIGS. 9A, 9B, and 9C are views illustrating the operating state of the height control devices according to the height of obstacles 60 in side collisions in the battery fire prevention apparatus according to the present disclosure.

Figure 10:
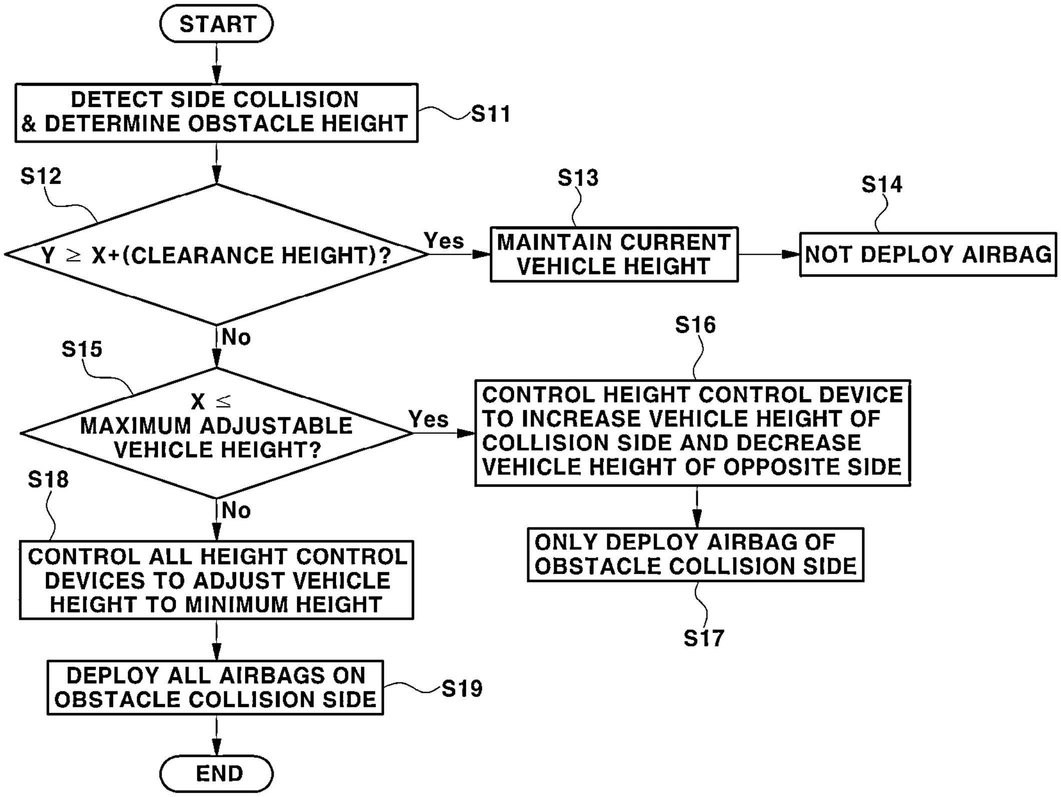
FIG. 10 is a flowchart illustrating the operation process of the battery fire prevention apparatus according to an embodiment of the present disclosure.

FIG. 10 is a flowchart illustrating the operation process of the battery fire prevention apparatus according to an embodiment of the present disclosure. Hereinafter, the operation process of the battery fire prevention apparatus is described with reference to FIG. 10.

FIG. 8 is a schematic view taken in the direction of the arrow B in FIG. 1. FIG. 8 illustrates the height control devices 50 disposed on the left portion and the right portion of the vehicle, the battery 1, and an obstacle 60 which is colliding with the right side of the vehicle.

In FIG. 8, 'X' indicates the height of the obstacle 60, and 'Y' indicates the height of the vehicle from the ground (hereinafter, also referred to as the "vehicle ground height") just before a collision. In FIG. 8, 'A' and 'B' also indicate the vehicle heights at respective positions adjusted by the height control devices 50. 'A' indicates the vehicle height adjusted by the height control devices 50 on the right portion of the vehicle, while 'B' indicates the vehicle height adjusted by the height control devices 50 on the right portion of the vehicle.

In one embodiment, the height control devices 50 are connected to the components of respective wheel-side suspensions to variably adjust the heights of the vehicle body (i.e., the vehicle heights) at respective disposed positions, i.e., the heights of the vehicle body between corresponding wheels and the vehicle body.

In FIG. 8, the height control devices 50 on the right portion of the vehicle indicate two height control devices disposed on the front and the rear of the right portion of the vehicle, while the height control devices 50 on the left portion of the vehicle indicate two height control devices disposed on the front and the rear of the left portion of the vehicle.

In one form, the controller 20 may control the two height control devices 50 disposed on the front and rear portions of the right portion of the vehicle to simultaneously have the same operating state or control the two height control devices 50 disposed on the front and rear portions of the left portion of the vehicle to simultaneously have the same operating state.

In other words, in the left portion of the vehicle, the vehicle heights of the left portion of the vehicle may be adjusted to be the same irrespective of the front position or the rear position by the two height control devices 50 disposed between the corresponding wheels (i.e., the front left wheel and the rear left wheel) and the vehicle body. In the same manner, the vehicle height of the right portion of the vehicle may be adjusted to be the same irrespective of the front position or the rear position by the two height control devices 50 disposed between the corresponding wheels (i.e., the front right wheel and the rear right wheel) and the vehicle body in the right portion of the vehicle.

FIG. 9A illustrates an example in which the colliding obstacle 60 has a low height and thus no impact is applied to the battery 1 when the default vehicle ground height is maintained.

As illustrated in FIG. 9A, because each of the vehicle ground height and the height of the battery 1 just before the collision is higher than the height of the obstacle 60, no impact is applied to the battery 1 in the obstacle collision. In this case, the height of the obstacle 60 may be determined by the controller 20 on the basis of obstacle detection signals received from the obstacle detectors 10.

In the present disclosure, when the obstacle collision is predicted on the basis of obstacle detection signals received from the obstacle detectors 10, the controller 20 determines the height X of the obstacle 60 (step S11 in FIG. 10), and compares the height X with the current vehicle ground height Y to determine whether or not to operate the height control devices 50 and the airbag devices 40 (step S12 in FIG. 10).

As in the example in FIG. 9A, when the current vehicle ground height Y is higher than the height X of the obstacle 60 by a predetermined clearance height (e.g., 10 mm) or more ($Y \geq X+10$ mm), it is not required to adjust the vehicle height and move the battery, and none of the height control devices 50 and the airbag devices 40 are not operated (i.e., current vehicle height maintaining step S13 and no airbag deployment step S14). That is, the current heights of all of the height control devices 50 are maintained, and none of the airbags 41 are deployed.

In addition, FIG. 9B illustrates an example in which the height of the collision-predicted obstacle 60 is a height at which the vehicle ground height may be adjusted so that no impact is applied to the battery 1.

When the vehicle ground height may be adjusted so that no impact is applied to the battery 1 as exemplified above, the left height control devices 50 and the right height control devices 50 are operated so that the vehicle leans to one side.

At this time, height control devices 50 on the left and right portions of the vehicle may be controlled by the controller 20 so that the vehicle ground height of one side of the left and right sides of the vehicle with which the obstacle 60 has collided is increased and the vehicle ground height of the opposite side is decreased.

In addition, only an airbag device 40 located on the obstacle collision portion of the front and rear portions of the side of the vehicle with which the obstacle 60 collides is controlled to perform the deploy operation. This is in consideration of the fact that even if only the airbag 41 in the portion with which the obstacle 60 collides is deployed in a state in which the vehicle is leaned, the battery 1 may be moved to the opposite side.

When an obstacle collision is predicted on the basis of obstacle detection signals received from the obstacle detectors 10, the controller 20 determines the height of the obstacle 60 (step S11 in FIG. 10). When the current vehicle ground height Y is not higher than the height of the obstacle 60 by the predetermined clearance height (e.g., 10 mm) or more, the controller 20 compares the height X of the obstacle with a predetermined maximum adjustable vehicle height (step S15 in FIG. 10).

When the height X of the obstacle 60 is lower than the maximum adjustable vehicle height, all of the left height control devices 50 and the right height control devices 50 are operated to lean the vehicle to one side in order to prevent the impact caused by the obstacle 60 is not applied to the battery 1.

Because the obstacle 60 is colliding with the right side of the vehicle in the example in FIG. 9B, the controller 20 controls the right height control devices 50 to increase the vehicle height and the left height control devices 50 to decrease the vehicle height (step S16 in FIG. 10).

At this time, both the front and rear height control devices 50 on the side of the vehicle with which the obstacle 60 collides are controlled to adjust the vehicle heights at the adjustable maximum height (or the highest height, i.e., the maximum adjustable vehicle height), while both the front and rear height control devices 50 on the opposite side of the collision are controlled to adjust the vehicle heights at the adjustable minimum height (or the lowest height, i.e., the minimum adjustable vehicle height)

All of the left height control devices 50 and the right height control devices 50 are operated in this manner so as to increase the vehicle heights of the obstacle collision side and decrease the vehicle heights of the opposite side. In this manner, the heights of both sides of the battery 1 are adjusted to avoid the obstacle 60 as much as possible.

When the vehicle is leaned, the lateral movement force of the battery 1 may be increased, in which case the battery 1 may be easily moved to the lowered side of the leaned body. In this regard, the controller 20 may be configured to operate only the airbag devices 40 in the obstacle collision area of the front and rear portions of the collision side (e.g., the right side with which the obstacle collides) of the vehicle (step S17 in FIG. 10).

When only the airbag 41 at the portion with which the obstacle 60 actually collides is deployed in a state in which the vehicle is leaned, both expanding force of the airbag 41 and the weight of the battery 1 may act together, thereby facilitating the movement of the battery 1 away from the collision side.

Next, FIG. 9C illustrates an example in which the height of the obstacle 60 is higher than the maximum adjustable vehicle height and a direct impact of the obstacle on the battery 1 is unavoidable even if the vehicle ground height is adjusted to the maximum height.

When the direct impact is unavoidable as in FIG. 9C, the controller 20 controls the operation of the height control devices 50 so as to decrease the vehicle ground height as low as possible (step S18 in FIG. 10) and controls all of the front and rear airbag devices 40 on the collision side to perform a deployment operation (step S19 in FIG. 10).

At this time, all of the height control devices 50 adjust the vehicle height to the adjustable minimum height, so that the vehicle is not leaned. The vehicle ground height is the minimum ground height in the adjustable range.

In a situation in which a direct impact of the obstacle 60 on the battery 1 is unavoidable as described above, the safety of vehicle behavior in response to the impact is increased by adjusting the ground height and the center of gravity of the vehicle as low as possible and controlling the vehicle to not lean. At the same time, both the front and rear airbag devices 40 of the collision side are controlled to perform the deployment operation, so that the battery 1 may be smoothly moved by the airbags 41 to the opposite side of the collision.

Because the vehicle is not leaned (i.e., the lateral movement force of the battery is insufficient), both the front and rear airbag devices 40 on the collision side are controlled to simultaneously perform the deployment operation, thereby allowing the battery 1 to be smoothly moved by the airbags 41.

As set forth above, the configuration and the operating state of the battery fire prevention apparatus according to the present disclosure have been described in detail. According to the above-described battery fire prevention apparatus, the battery 1 may be effectively protected from the impact caused by the obstacle 60 and a battery fire may be prevented by controlling the operations of the battery fixing devices 30, the airbag devices 40, and the height control devices 50 after the obstacle collision on the vehicle side is detected.

Although the specific embodiments of the present disclosure have been described in detail hereinabove, the scope of the present disclosure is not limited to the foregoing embodiments. Those having ordinary skill in the art could make various modifications and improvements on the basis of the principle of the present disclosure, as defined in the appended claims, without departing from the scope of the present disclosure as defined in the appended claims.

What is claimed is:

1. A battery fire prevention apparatus for a vehicle, the battery fire prevention apparatus comprising:
- a mounting frame to which a battery is fixedly coupled;
- obstacle detectors configured to detect an obstacle expected to collide with the vehicle;
- a controller configured to:
  - output a control signal to protect the battery from the obstacle and
  - prevent a battery fire when an obstacle collision on the vehicle is predicted from signals from the obstacle detectors;
- battery fixing devices disposed on the mounting frame and configured to fix the battery to the mounting frame and release the battery in response to the control signal from the controller, wherein when the battery is released, the mounting frame is configured to guide the battery in a manner that allows the battery to slide; and
- airbag devices each configured to expand and deploy an airbag in response to the control signal from the controller to protect the battery from an impact caused by the obstacle and simultaneously push the battery to slide and move along the mounting frame.

2. The battery fire prevention apparatus of claim 1, wherein the mounting frame is configured to guide the battery to be slidably movable in a left-right direction of a vehicle body,
- the obstacle detectors are configured to detect the obstacle expected to collide a side of the vehicle, and
- the airbag devices are disposed on side portions of the vehicle.

3. The battery fire prevention apparatus of claim 2, wherein the controller is configured to:
- output the control signal when the obstacle collision on a side of the vehicle is predicted based on the signals from the obstacle detectors;
- control the battery fixing devices to release the battery; and
- control at least one of the airbag devices on the side with which the obstacle has collided to perform a deployment operation to push and move the battery away from the side with which the obstacle collides.

4. The battery fire prevention apparatus of claim 2, wherein the mounting frame comprises:
- a pair of first frames disposed on left and right portions of the vehicle body and extending in a front-back longitudinal direction of the vehicle body; and
- a pair of second frames disposed on front and rear portions of the vehicle body to be in parallel to each other and extending in a left-right transverse direction of the vehicle body.

5. The battery fire prevention apparatus of claim 4, wherein:
- the battery is disposed between the pair of first frames and coupled to the pair of second frames to be slidably movable in a left-right direction of the vehicle body, and
- the battery is fixed to or released from the second frames by the battery fixing devices.

6. The battery fire prevention apparatus of claim 5, wherein front and rear end portions of the battery are coupled to the second frames by a rail structure, and
- the rail structure comprises:
  - rail couplers provided on the front and rear end portions of the battery, respectively, and
  - rail portions disposed on the pair of second frames, wherein the rail couplers are slidably movably coupled to the rail portions.

7. The battery fire prevention apparatus of claim 6, wherein:
- the battery fixing devices respectively comprise a stopper configured to move back and forth in response to the control signal output by the controller, and
- the rail couplers respectively comprise a stopper fixing portion into which a corresponding stopper of the stoppers is fitted by forward movement so that the battery is fixed by the battery fixing devices.

8. The battery fire prevention apparatus of claim 7, wherein the stopper fixing portions comprise:
- first fixing recesses allowing the stoppers of the battery fixing devices to be fitted thereinto by forward movement when the battery is located at a mounting position in a normal state at normal times; and
- second fixing recesses allowing the stoppers of the battery fixing devices to be fitted thereinto by forward movement when the battery is moved by the expanded and deployed airbag.

9. The battery fire prevention apparatus of claim 4, wherein the airbag devices are disposed on the pair of first frames, respectively, and are configured to expand and deploy the corresponding airbags to push and move the battery along the second frames.

10. The battery fire prevention apparatus of claim 9, wherein the airbag devices are disposed on front and rear portions of the first frames with respect to a direction of the vehicle body.

11. The battery fire prevention apparatus of claim 2, further comprising: height control devices configured to adjust vehicle heights of left and right portions of the vehicle body in response to the control signal from the controller.

12. The battery fire prevention apparatus of claim 11, wherein the controller is configured to:

determine a height of the obstacle based on the signals from the obstacle detectors;

compare the determined height of the obstacle with a current vehicle ground height; and when the current vehicle ground height is higher than the height of the obstacle by a predetermined clearance height, operate none of the height control device and the airbag device and maintain a current vehicle height and an airbag-not-deployed state.

13. The battery fire prevention apparatus of claim 11, wherein the controller is configured to:

determine a height of the obstacle based on the signals from the obstacle detectors;

compare the determined height of the obstacle with a current vehicle ground height;

when the current vehicle ground height is not higher than the height of the obstacle by a predetermined clearance height, compare the height of the obstacle with a predetermined maximum adjustable vehicle height; and when the height of the obstacle is lower than the maximum adjustable vehicle height, output the control signal to control operations of the height control devices to increase a vehicle height of a side of the vehicle with which the obstacle collides and decrease a vehicle height of a side of the vehicle opposite to the obstacle collision.

14. The battery fire prevention apparatus of claim 13, wherein the controller is configured to output the control signal to control the operations of the height control devices to increase the vehicle height of the side of the vehicle with which the obstacle collides to the maximum adjustable vehicle height and to decrease the vehicle height of the side of the vehicle opposite to the obstacle collision to a minimum adjustable vehicle height.

15. The battery fire prevention apparatus of claim 13, wherein an airbag device of the airbag devices on a side portion of the vehicle body with which the obstacle collides is controlled to perform a deployment operation to push the battery.

16. The battery fire prevention apparatus of claim 13, wherein the airbag devices are disposed on front and rear portions of the mounting frame on the side portions of the vehicle body with respect to the direction of the vehicle body, and the controller is configured to: when the height of the obstacle is lower than the maximum adjustable vehicle height, determine a portion to be collided with the obstacle from front and rear portions of the side of the vehicle in response to the signals from the obstacle detectors; and control only the airbag device on the portion to be collided with the obstacle from the front and rear airbag devices to perform a deployment operation to push the battery.

17. The battery fire prevention apparatus of claim 11, wherein the controller is configured to:

determine a height of the obstacle to be collided based on the signals from the obstacle detectors;

compare the determined height of the obstacle with a predetermined maximum adjustable vehicle height; and when the height of the obstacle is higher than the maximum adjustable vehicle height, output the control signal to control operations of the height control devices to decrease vehicle heights of both left and right portions of the vehicle body to a predetermined minimum adjustable vehicle height.

18. The battery fire prevention apparatus of claim 17, wherein when the height of the obstacle is higher than the maximum adjustable vehicle height, the controller is configured to control the airbag device on a side portion of the vehicle with which the obstacle collides to perform a deployment operation to push and move the battery away from the obstacle collision.

* * * * *